United States Patent
Goldenthal et al.

(10) Patent No.: US 6,205,424 B1
(45) Date of Patent: *Mar. 20, 2001

(54) TWO-STAGED COHORT SELECTION FOR SPEAKER VERIFICATION SYSTEM

(75) Inventors: William D. Goldenthal, Brooklyn, NY (US); Brian S. Eberman, Newton, MA (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/692,937

(22) Filed: Jul. 31, 1996

(51) Int. Cl.$^7$ ............................................................ G10L 5/04
(52) U.S. Cl. ........................... 704/247; 704/250; 704/245
(58) Field of Search .................. 395/2.4, 2.5, 2.55–2.84; 704/246–250, 231, 241, 245, 275

(56) References Cited

U.S. PATENT DOCUMENTS

| | | | |
|---|---|---|---|
| 4,716,593 | * 12/1987 | Hirai et al. | 704/247 |
| 4,720,863 | * 1/1988 | Li et al. | 704/247 |
| 4,903,306 | * 2/1990 | Nakamura | 704/247 |
| 4,961,229 | 10/1990 | Takahashi | 704/246 |
| 5,274,695 | 12/1993 | Green | 379/88 |
| 5,598,507 | * 1/1997 | Kimber et al. | 704/247 |
| 5,625,747 | 4/1997 | Goldberg et al. | 395/2.52 |

FOREIGN PATENT DOCUMENTS

| | | | |
|---|---|---|---|
| 0397 399 A2 | 5/1990 | (EP) | G10L/5/06 |
| 0 592 150 A1 | 4/1994 | (EP). | |
| 0 622 780 A2 | 4/1994 | (EP) | G10L/5/06 |
| 0 821 346 A2 | 1/1998 | (EP). | |
| 96/17341 | 6/1996 | (WO). | |

OTHER PUBLICATIONS

Speaker Recognition Using HMM with Experiments on the Yoho Database, ChiWei Che and QiguangLin (e–mail: [cche, qlin]@caip.rutgers.edu), CAIP Center, Rutgers Univ., Piscataway, New Jersey 08855–1390, USA.

The Use of Cohort Normalized Scores for Speaker Verification, Rosenberg et al., Speech Research Dept., AT&T Bell Labs, Murray Hill, New Jersey 07974, USA.

Statistical Trajectory Models for Phonetic Recognition, William D. Goldenthal, Ph.D. dissertation, Sep. 1994, Dept. of Aeronautics and Austronautics, Massachusetts Institute of Technology, Boston, Mass., USA.

Rosenberg, A. E. et al.: "Speaker backround models for connected digit password speaker verification" 1996 IEEE International Conference Proceedings (Cat. No. 96CH35903), 1996 IEEE International Conference on Acoustics, Speech, and Signal Processing Conference Proceedings, Atlanta, GA, USA, pp.81–84, vol. 1.

* cited by examiner

Primary Examiner—David D. Knepper
(74) Attorney, Agent, or Firm—Hamilton, Brook, Smith & Reynolds, P.C.

(57) ABSTRACT

Speech signals from speakers having known identities are used to create sets of acoustic models. The acoustic models along with their corresponding identities are stored in a memory. A plurality of sets of cohort models that characterize the speech signals are selected from the stored sets of acoustic models, and linked to the set of acoustic models of each identified speaker. During a testing session speech signals produced by an unknown speaker having a claimed identity are processed to generate processed speech signals. The processed speech signals are compared to the set of models of the claimed speaker to produce first scores. The processed speech signals are also compared to the sets cohort models to produce second scores. A subset of scores are dynamically selected from the second scores according to a predetermined criteria. The unknown speaker is validated as the claimed speaker if the difference between the first and a combination of the subset of scores is greater than a predetermined threshold value.

28 Claims, 3 Drawing Sheets

TWO-STAGED COHORT SELECTION FOR SPEAKER VERIFICATION SYSTEM

FIELD OF THE INVENTION

The present invention relates generally to automatic speech processing, and more particularly to verifying the identity of individuals according to spoken utterances.

BACKGROUND OF THE INVENTION

Speakers produce speech by forcing air through the vocal tract while in a coordinated manner manipulating a set of articulators. The articulators include the tongue, lips, jaws, vocal cords, and the velum. The vocal tract includes the lungs, throat, mouth, and nasal passages. The speaker dependent physiological characteristics of the articulators and the vocal tract cause acoustic variability in the rendered speech of different speakers. In addition, the dynamics of the articulatory gestures used during the production of speech vary among speakers.

Taking advantage of these variations, it is an object of the present invention to verify if a speaker is who she or he claims to be based on their spoken utterances, independent of speech content.

Automated speaker verification can be of substantial value in applications where the true identity of individuals is of paramount importance, for example, financial transactions involving credit cards or phone calling cards are notoriously prone to fraud. The losses to banks and credit card companies alone are estimated to run between five and ten billion dollars annually. Speaker verification can also be used to reduce the unauthorized use of voice communication devices such as cellular telephones.

In a speaker verification system, individuals having known identities supply utterances or speech samples during "training" sessions. A sample of continuous speech signals is digitally analyzed to form a temporal discrete sequence of observation vectors, each of which contains a set of acoustic features. Each observation vector is called a "frame" of speech. The components of the frames can be acoustic attributes that have been chosen to represent the discrete portions of the speech signal. The frames of the various individuals can be further processed to create models representing the speech. The models can be stored in a database along with an identity of the corresponding individuals.

Subsequently, the claimed identity of an individual can be verified by having the individual utter a prompted sequence of words or spontaneous speech during a "testing" session. These "validation" or testing speech signals are analyzed and compared with the prestored observation models corresponding to the "claimed" identity to determine scores. For example, the scores can be expressed as log likelihood scores: score=log p(O/I). In this example, p represents the likelihood that the observed frames O were produced by the individual I. If the scores exceed a predetermined threshold, it is presumed that the individual is who he or she claims to be.

Ideally, under consistent acoustic conditions, it is possible to pose the speaker verification problem as a simple hypothesis test. Unfortunately, the acoustic variabilities between training and testing conditions complicate the problem. For example, microphones used during training can have different acoustic capabilities from those used during testing. There can also be differences in background noise features. In addition, the speech samples used during testing may arrive at a centralized verification site via a telephone network with unpredictable transmission characteristics likely distorting the signals. Furthermore, sampling rates used during training can be different than sampling rates used during testing.

All of these factors can increase equal error rates. The equal error rate is the point where the percentage of erroneously rejected correct speakers (false negatives) is equal to the percentage of erroneously accepted impostors (false positives). Systems with lower equal error rates have better performance.

In the prior art, cohort normalization has been used as a technique to minimize equal error rates. In cohort normalization, the models of each individual speaker are linked to the models of "cohort" individuals. The cohorts can be selected from the pool of all speakers who have "trained" models. Alternatively, the cohort models can be synthesized from the models of several speakers. In the prior art, a small number, typically less then ten, "cohort" models are linked to the models of each identified individual. Generally, error rates increase if more cohorts are used.

During testing, the score obtained from the models of the speaker whose identity is claimed is compared with all of the scores derived from the small set of cohort models to produce a set of score differences. The differences are then used as a "normalized" score, for example: normalized score=log p (O/I)—f[log p (O/($C_k$(I))], where log p (O/($C_k$(I)) are the scores for the k cohorts linked to the claimed individual. A function f can combine all of the cohort scores during the normalization. The function can be statistical in nature, for example, maximum, average, percentile, median, or mean, or the output of a neural network.

Cohort normalization provides thresholds which compensate for acoustic variations during testing conditions. Determining the difference between the scores of a claimed speaker and the scores of cohorts has proven to be very effective, please see Rosenberg, Delone, Lee, Juang, and Soong, *The Use of Cohort Normalized Scores for Speaker Verification*, Proc. ICSLP, October, 1992 pp. 599–602. Here, a factor of five reduction in the error rate is reported for cross-microphone conditions using a set of five cohorts.

In the prior art, the specific speaker's set of cohorts are selected by some metric of "closeness," e.g., multi-dimensional statistical distance, to the speaker's models in the acoustic space based on the training data. However, it has been observed that low scores for a given utterance for one or more of the selected cohorts can still result in a substantial degradation of system performance.

To compensate for the lower scores, the score threshold can be set to a larger value so that impostors who are able to beat the lower scores are more likely to be rejected. However, increasing the threshold also increases the likelihood that a valid speaker will be erroneously rejected, e.g. an increase in the equal error rate.

Therefore, there is a need for a cohort selection mechanism which reduces the equal error rate. Reducing the equal error rate increases the likelihood of rejecting impostors, while decreasing the rate of erroneously rejecting individuals who are in fact who they claim to be, even in the presence of variations in the acoustic environment during testing.

SUMMARY OF THE INVENTION

In the present invention, a two-stage cohort selection technique is used to reduce the equal error rate of a speaker verification process which validates the claimed identity of an unknown speaker.

More particularly, during a training or enrollment session, speech signals from speakers having known identities are used to create sets of acoustic models. The acoustic models, along with the corresponding speaker identities, are stored in a memory for later use. The memory can be a magnetic strip on the back of a credit card used at a point-of-sale, or a centralized database accessible via a network.

A plurality of sets of cohort models are selected from the sets of acoustic models for each speaker during the training sessions. The plurality of sets of cohort models selected are ones that characterize the speech of the corresponding speaker. The sets of cohort models are linked to the set of acoustic models of each identified speaker.

During a testing session, speech signals produced by an unknown speaker having a claimed identity are processed to generated processed speech signals.

The processed speech signals are compared to the set of acoustic models of the claimed speaker to produce first scores. The processed speech signals are also compared to the sets of cohort models to produce second scores. A subset of scores are selected from the second scores according to a predetermined selection criteria. For example, the subset of scores are selected for cohort models which best characterize the processed speech of the testing session.

The unknown speaker is validated as the claimed speaker if the difference between the first scores and a combination of the subset of second scores is greater than a predetermined threshold value.

DETAILED DESCRIPTION OF PREFERRED EMBODIMENTS

Speech is produced by the coordinated manipulation of a set of acoustic articulators of the vocal tract. The physiological characteristics of the articulators which produce the acoustic output are speaker dependent. A speaker verification system is proposed which uses a two-stage cohort selection process for the normalization of validation scores.

Figure 1:
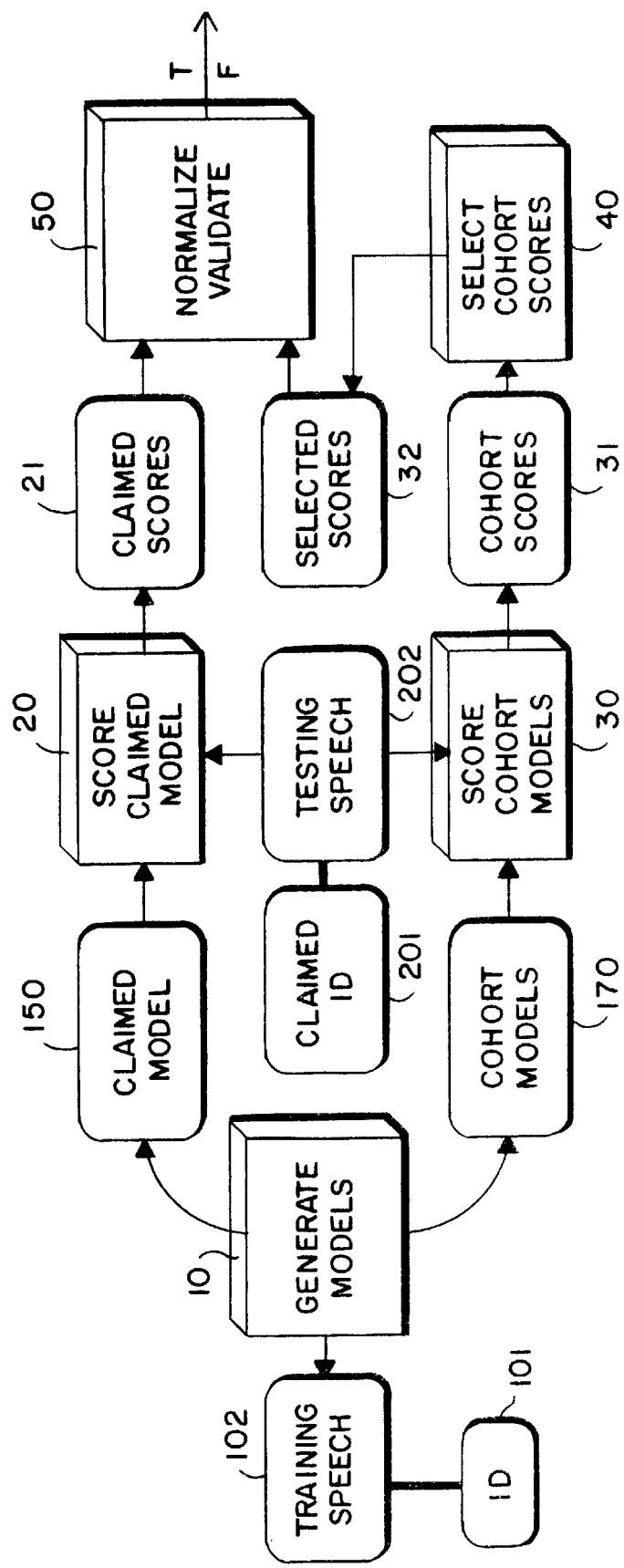
FIG. 1 is shows a process for speaker verification according to the invention.
Figure 2:
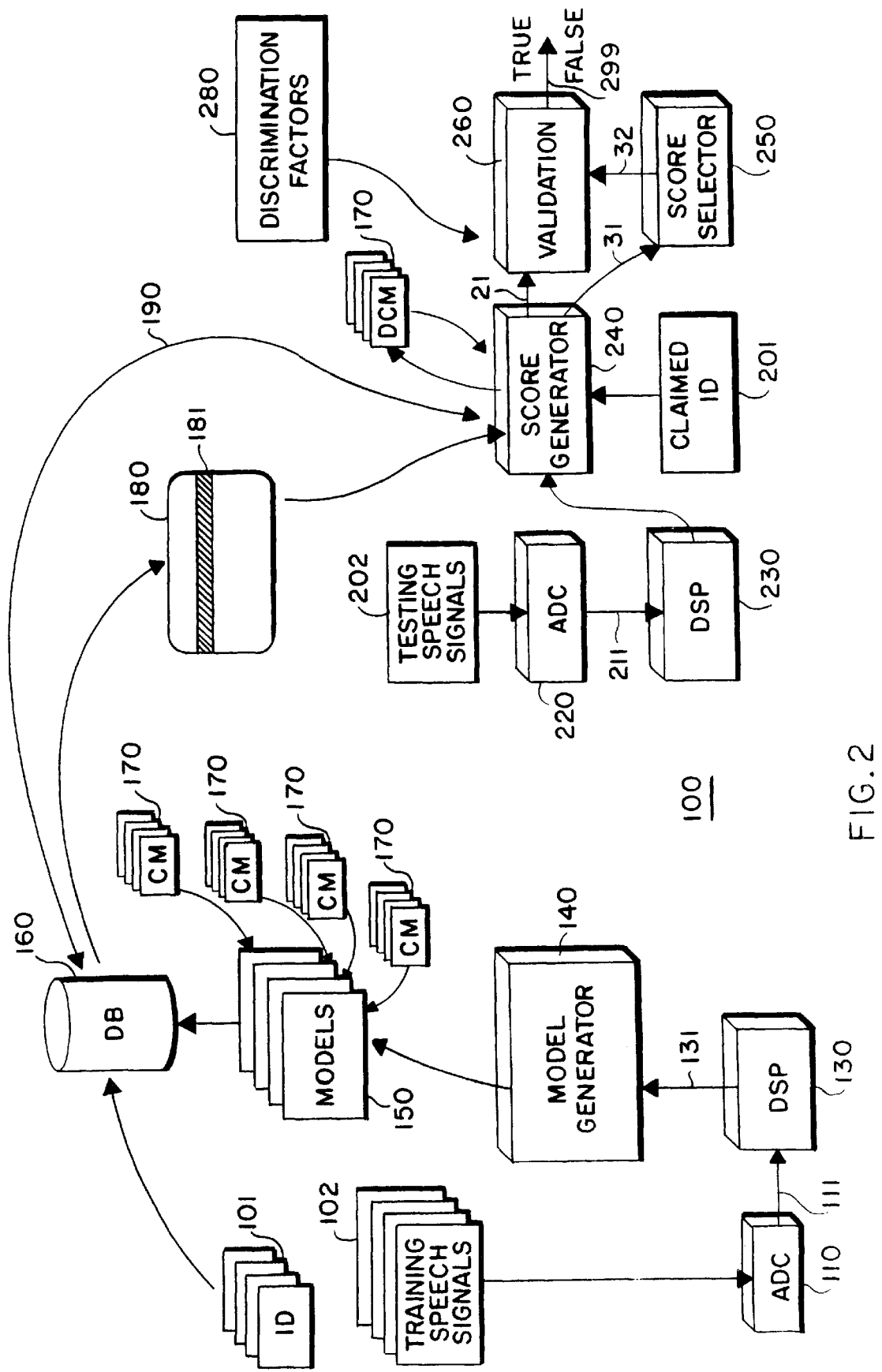
FIG. 2 is a flow diagram of a two-stage cohort selection process.

FIGS. 1 and 2 generally show a two-stage cohort selection process used for speaker verification. During training or enrollment sessions, speakers having known identities 101 supply training speech signals 102. An analog-to-digital convertor (ADC) 110 of FIG. 2 converts the continuous analog acoustic waveform of the training speech signals 102 to digital signals on line 111. A digital signal processor (DSP) 130 converts the digitized signals to a temporal sequence of vectors or observation frames on line 131.

For example, the DSP 130 can produce Mel-Frequency cepstral coefficients (MFCC) based on short-time Fourier transforms of the digital signals. The MFCC representation is described by P. Mermelstein and S. Davies in *Comparison of Parametric Representation for monosyllabic Word Recognition in Continuously Spoken Sentences*, IEEE Trans ASSP, Vol. 23, No. 1, pages 67–72, February 1975.

The cepstral coefficients provide a high degree of data reduction, since the power spectrum of each of the frames is represented using relatively few parameters. Each frame parameterizes a set of acoustic features which represent the continuous waveform 102 at a given point in time. Each frame includes, for example, the MFCC parameters.

The frames are further processed by a model generator 140 to produce sets of acoustic models 150 which characterize the original speech signals 102, step 10 of FIG. 1. There is one set of acoustic models 150 for every identified speaker desiring enrollment. The sets of acoustic models 150 can be stored in a model database (DB) 160 along with their respective identities 101.

In order to produce the models 150, the model generator 140 can use a pattern classification and recognition methodology which is a segment based approach to speech processing. The segment based approach is called statistical trajectory modeling (STM). For a detailed description of STM as applied to speech processing, see U.S. Pat. No. 5,625,749 entitled Apparatus and Method for Speech Recognition, filed by Goldenthal et al., on Aug. 22, 1994, incorporated herein by reference. For a description of STM as applied to speaker verification, see U.S. patent application Ser. No. 08/582,689, entitled Speaker Verification System, filed by Goldenthal on Jan. 4, 1996, also incorporated by reference herein although it will be recognized that other well known techniques could alternatively be used.

According to STM, each set of acoustic models 150 comprise "tracks" and error statistics. Tracks are defined as a trajectory or temporal evolution of dynamic acoustic attributes over segments of speech. During statistical trajectory modeling, a track is mapped onto designated segments of speech of variable duration. The designated segments can be units of speech, for example, phones, or transition from one phone to another.

The purpose of the tracks is to accurately represent and account for the dynamic behavior of the acoustic attributes over the duration of the segments of the speech signals. The error statistics are a measure of how well a track is expected to map onto an identified unit of speech. The error statistics can be produced by correlating synthetic units of speech generated from the track with the actual units of speech. The synthetic unit of speech can be generated by "deforming" the track to best fit the unit of speech.

In addition to creating the models 150, the training speech signals 102 of each identified speaker are compared with the sets of models of other speakers stored in the database 160. The other speakers whose models are used for comparison can have speaker dependent similarities, e.g., age, gender, height, and weight. This produces scores, as described above. The scores indicate a measure of the difference between the training speech 102 signals of the identified speaker and the models of the other speakers.

A plurality of sets of "cohort" models (CM) 170, which characterize the speech signals of each identified speaker, are selected from the available sets of acoustic models of the other speakers. The selection can be made according to predetermined selection criteria, for example, the models which best characterize the speech of the identified speaker, or the models whose characterization fits some predetermined probability density function. The selected sets of cohort models 170 are linked with the set of models of the identified speaker.

According lo the invention, the number of sets of cohort models selected is substantially larger than what is indicated in the prior art. For example, the sets of cohort models can be larger by a factor of five or ten, e.g., about twenty-five to fifty sets of models. Further improvements, although smaller, can be demonstrated, with even larger number of sets of cohort models.

The set of models 150 of a particular identified speaker, and the corresponding sets of cohort models 170, can be recorded on a magnetic strip 181 attached to the back of a credit card 180, or in a centralized database accessible by a communications network.

Subsequently during a testing session, an unknown speaker having a claimed identity 201 supplies testing speech signals 202. Another analog-to-digital convertor (ADC) 220 can convert the continuous analog acoustic waveform of the testing speech signals 202 to digital signals on line 211 to be processed by another digital signal processor (DSP) 230.

The output of the DSP 230 can be presented to a score generator 240. The score generator 240 can acquire the set of models 150 and linked cohort models 170 corresponding to the claimed identity 201 represented by the unknown speaker. The models 150 and 170 can be read from the credit card 180, or acquired via a communications network 190 from the database 160 using the claimed identification 201.

In step 20 of FIG. 1, the digitized signals of the unknown speaker seeking verification are compared with the acoustic models corresponding to the claimed identification 201 to determine "claimed" log likelihood scores 21.

In step 30, the same testing signals are compared with all of the cohort models 170 to determine cohort log likelihood scores 31. The cohort scores 31 are presented to a score selector 250. The score selector 250 selects a substantially smaller subset of cohort scores determined from a subset of cohort models. The number of cohort scores dynamically selected in step 40 of FIG. 1 is about an order of magnitude five smaller than all of the cohort models 170 scored.

The claimed scores 21 and the dynamically selected cohort scores 32 are presented to a validator 260. The selected cohort scores 32 can be combined by some function, for example a statistical function such as averaging, mean selection, median selection, probability density function, or the like.

The difference between the claimed score 21 and the combined subset of scores 32 is determined. The difference is compared with a threshold value by a validator 260 according to predetermined discrimination factors 280, to produce, for example, a true or false logical condition 299 FIG. 2, step 50 FIG. 1. If the difference exceeds the threshold value, then the true condition is given, otherwise the condition is false. The true or false conditions 299 indicate whether or not the unknown speaker is who she or he claims to be.

It should be understood that the ADCs 110 and 220, and the DSPs 130 and 230 can be the same in a centralized speech verification system.

Figure 3:
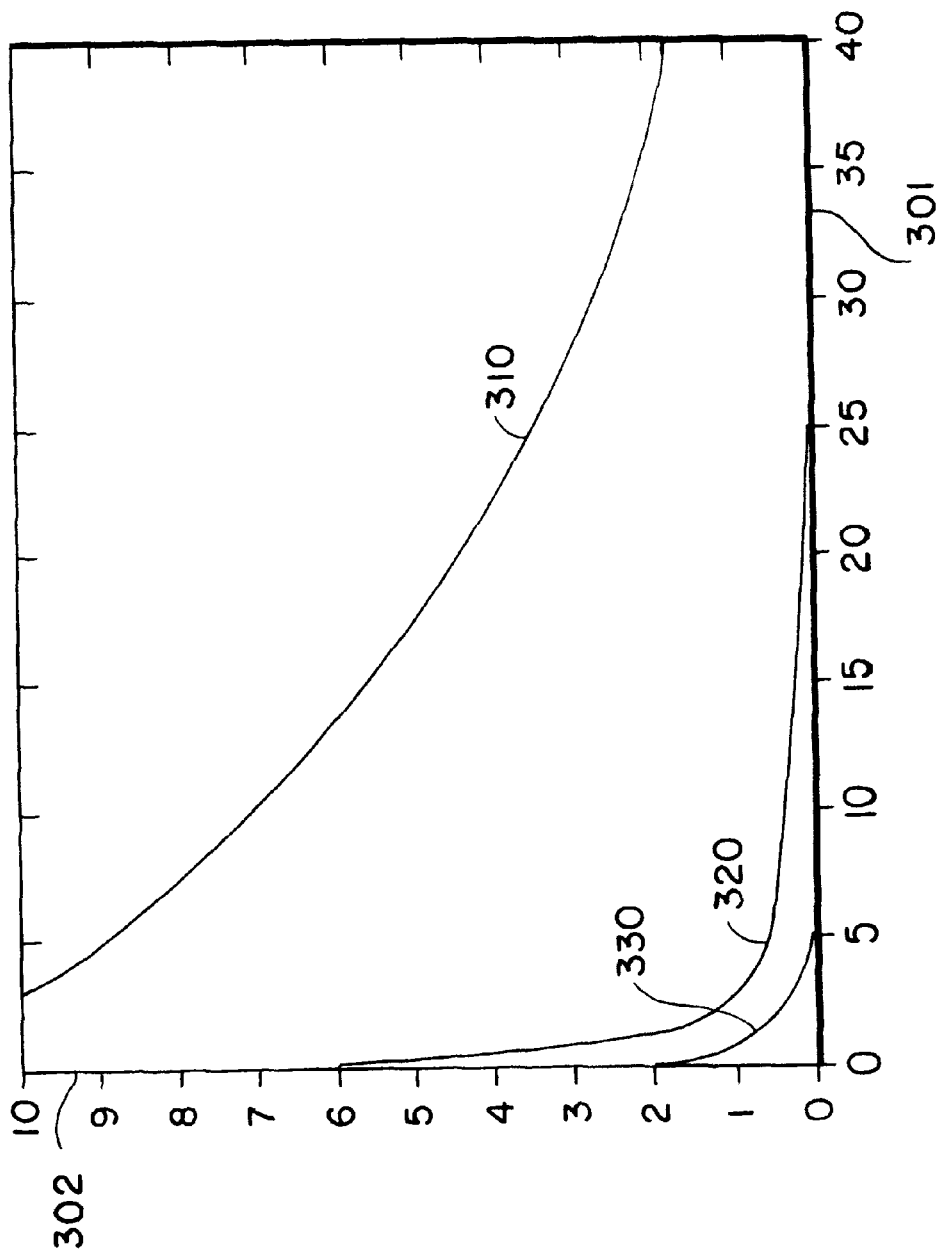
FIG. 3 compares results of the two-staged selection process with prior art single stage cohort selection.

FIG. 3 shows "receiver operating characteristic" (ROC) curves for error rates using various cohort selection techniques. The x-axis 301 indicates the percentage of "correct" speakers erroneously rejected (false negatives). The y-axis 302 indicates the percentage of "impostors" incorrectly accepted (false positives) for a given threshold.

The curve 310 represents error rates obtained using a traditional one-stage cohort selection process using all the scores of a small number (five) of cohorts during normalization and validation. Curve 320 represents results for a subset of five cohort scores dynamically selected from fifty scores determined from a much larger pool of fifty cohort models selected during training. Curve 330 represents error rates for a subset of five cohort scores selected from the scores for a pool of 167 cohorts.

It should be apparent that selecting cohort models and scores in a two-stage process comprising a large group of cohort models and a subset of scores from the models yields a substantial reduction in the equal error rate, for example, a reduction by a factor of three to five over what is possible with a traditional single-stage selection process.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of this invention.

We claim:

1. A method for verifying a claimed identity of a speaker, the method comprising the steps of:

processing training speech signals to create sets of acoustic models, the training speech signals being produced by speakers having known identities during training sessions, there being one set of acoustic models for each identified speaker;

selecting from the sets of acoustic models a plurality of sets of cohort models for each identified speaker, each of the plurality of sets of cohort models characterizing the speech of a corresponding identified speaker;

processing testing speech signals produced by an unknown speaker claiming to be one of the identified speakers to generate processed testing speech signals during a testing session;

comparing the processed testing speech signals and the set of acoustic models for the claimed identified speaker to determine first scores;

comparing the processed testing speech signals and the plurality of sets of cohort models for the claimed identified speaker to determine second scores;

selecting a subset of scores from the second scores, the subset of scores corresponding to sets of cohort models which characterize the testing speech signals according to a predetermined criteria;

validating that the unknown speaker is the claimed identified speaker if the difference between the first scores and a predetermined combination of the subset of scores is greater than a predetermined threshold value.

2. The method of claim 1, wherein the number of sets in the plurality of sets of cohort models selected for the claimed identified speaker is substantially greater than the number of the sets of cohort models with second scores included in the predetermined combination of the subset of scores.

3. The method of claim 1, further comprising:
storing the set of acoustic models and the plurality of sets of cohort models for an identified speaker on a magnetic strip attached to a credit card.

4. The method of claim 1, further comprising:
acquiring the testing speech signals via a communications network.

5. The method of claim 1, further comprising:
acquiring the training speech signals via a communications network.

6. The method of claim 1, further comprising:
storing each set of acoustic models in association with the identity of each corresponding identified speaker in a memory.

7. The method of claim 1, further comprising:
linking the plurality of sets of cohort models to the set of acoustic models for each identified speaker.

8. The method of claim 1, wherein the step of selecting a subset of scores from the second scores is performed dynamically.

9. The method of claim 1, wherein the predetermined criteria is which cohort models best characterize the testing speech signals.

10. The method of claim 1, wherein the predetermined combination of the subset of scores is one of an averaging, a mean selection, a median selection, or a probability density.

11. The method of claim 1, wherein the predetermined threshold value is associated with a predetermined discrimination factor.

12. A method for selecting cohort scores in a speech verification system, the method comprising the steps of:

selecting a set of cohort models which characterize a first speech sample during a first session;

comparing the set of cohort models to a second speech sample during a second session to determine cohort scores;

selecting a subset of the cohort scores which best characterizes the second speech sample; and verifying a claimed identity of an unknown speaker using the subset of scores.

13. A method for verifying speech, the method comprising the steps of:

selecting a plurality of sets of cohort models characterizing a first speech sample;

comparing the plurality of sets of cohort models to a second speech sample to determine cohort scores;

selecting a portion of the cohort scores; and verifying that a speaker is a known speaker based upon the selected portion of the cohort scores.

14. The method of claim 13, further comprising the steps of:

generating a set of acoustic models for the first speech sample; and comparing the set of acoustic models for the first speech sample to the second speech sample to determine acoustic scores.

15. The method of claim 14, wherein the step of verifying that the speaker is the known speaker based upon the selected portion of the cohort scores includes verifying that the speaker is the known speaker if the difference between the acoustic scores and a predetermined combination of the selected portion of the cohort scores is greater than a predetermined threshold value.

16. The method of claim 15, wherein the predetermined combination of the selected portion of the cohort scores is one of an averaging, a mean selection, a median selection, or a probability density.

17. The method of claim 15, wherein the predetermined threshold value is associated with a predetermined discrimination factor.

18. The method of claim 13, wherein the step of selecting the portion of the cohort scores includes selecting the portion of the cohort scores which characterizes the second speech sample according to a predetermined criteria.

19. The method of claim 18, wherein the predetermined criteria is based upon the cohort models which best characterize the second speech sample.

20. The method of claim 13, wherein the step of selecting the portion of the cohort scores includes dynamically selecting the portion of the cohort scores.

21. An apparatus for verifying speech, the apparatus comprising:

a first selector for selecting a plurality of sets of cohort models characterizing a first speech sample;

a first comparator for comparing the plurality of sets of cohort models to a second speech sample to determine cohort scores;

a second selector for selecting a portion of the cohort scores; and a verifier for verifying that a unknown speaker is a known speaker based upon the selected portion of the cohort scores.

22. The apparatus of claim 21, further comprising:

a generator for generating a set of acoustic models for the first speech sample; and a second comparator for comparing the set of acoustic models for the first speech sample to the second speech sample to determine acoustic scores.

23. The apparatus of claim 22, wherein the verifier verifies that the speaker is the known speaker if the difference between the acoustic scores and a predetermined combination of the selected portion of the cohort scores is greater than a predetermined threshold value.

24. The apparatus of claim 23, wherein the predetermined combination of the selected portion of the cohort scores is one of an averaging, a mean selection, a median selection, or a probability density.

25. The apparatus of claim 23, wherein the predetermined threshold value is associated with a predetermined discrimination factor.

26. The apparatus of claim 21, wherein the second selector selects the portion of the cohort scores which characterizes the second speech sample according to a predetermined criteria.

27. The apparatus of claim 26, wherein the predetermined criteria is based upon the cohort models which best characterize the second speech sample.

28. The apparatus of claim 21, wherein second selector dynamically selects the portion of the cohort scores.

\* \* \* \* \*